United States Patent
Ladd (10) Patent No.: US 8,911,836 B2
(45) Date of Patent: Dec. 16, 2014

(54) SPECTRALLY SELECTIVE COATINGS AND ASSOCIATED METHODS FOR MINIMIZING THE EFFECTS OF LIGHTNING STRIKES

(75) Inventor: Michael M. Ladd, Renton, WA (US)

(73) Assignee: The Boeing Company, Chicago, IL (US)

( * ) Notice: Subject to any disclaimer, the term of this patent is extended or adjusted under 35 U.S.C. 154(b) by 765 days.

(21) Appl. No.: 12/474,965

(22) Filed: May 29, 2009

(65) Prior Publication Data

US 2010/0304044 A1 Dec. 2, 2010

(51) Int. Cl.
*H05H 1/24* (2006.01)
*B05B 5/00* (2006.01)
*B05D 7/00* (2006.01)
*C09D 5/33* (2006.01)
*B64D 45/02* (2006.01)

(52) U.S. Cl.
CPC ............... *C09D 5/004* (2013.01); *B64D 45/02* (2013.01)
USPC ........................... 427/569; 427/160; 427/222

(58) Field of Classification Search
USPC .............. 378/84, 85; 427/136, 160, 222, 457, 427/569
See application file for complete search history.

(56) References Cited

U.S. PATENT DOCUMENTS

| | | | | |
|---|---|---|---|---|
| 4,793,669 A | | 12/1988 | Perilloux | |
| 4,824,713 A | * | 4/1989 | Brick | 428/144 |
| 4,925,259 A | * | 5/1990 | Emmett | 359/359 |
| 5,370,921 A | * | 12/1994 | Cedarleaf | 428/138 |
| 7,223,312 B2 | * | 5/2007 | Vargo et al. | 156/71 |
| 2001/0036545 A1 | * | 11/2001 | Nishi et al. | 428/315.7 |
| 2003/0059549 A1 | | 3/2003 | Morrow et al. | |
| 2008/0124537 A1 | * | 5/2008 | Minks et al. | 428/327 |

FOREIGN PATENT DOCUMENTS

| | | |
|---|---|---|
| DE | 102006046002 | 4/2008 |
| EP | 1122285 | 8/2001 |
| WO | 2008/021537 | 2/2008 |
| WO | 2008/025959 | 3/2008 |

OTHER PUBLICATIONS

PCT, International Search Report and Written Opinion, International Application No. PCT/US2010/035193; 15 pages (Aug. 5, 2010).
Brewster, M. Quinn, *Thermal Radiative Transfer and Properties*, Chapter 9, "Radiative Properties of Particles," pp. 301-336, published by John Wiley & Sons, Inc., (1992).
McClay, James A. et al., "157 nm optical lithography: The accomplishments and the challenges," *Solid State Technology*, vol. 42, No. 6, p. 57 et seq. (Jun. 1999).

* cited by examiner

*Primary Examiner* — Michael Wieczorek
(74) *Attorney, Agent, or Firm* — Diane M. Tsuda (57) ABSTRACT

A method for reducing structural damage to a substrate resulting from interaction between the substrate and a plasma, the method including the steps of identifying a wavelength at which a spectral radiance of the plasma is at a peak, the wavelength being a function of a temperature of the plasma, preparing a coating capable of imparting to the substrate a threshold electromagnetic reflectivity over a spectral band about the wavelength, and applying the coating to the substrate.

15 Claims, 8 Drawing Sheets

SPECTRALLY SELECTIVE COATINGS AND ASSOCIATED METHODS FOR MINIMIZING THE EFFECTS OF LIGHTNING STRIKES

FIELD

The present patent application relates to coatings and methods for resisting plasma damage and degradation and, more particularly, to coatings and associated methods for imparting substrates with the ability to withstand lightning strikes and exposure to similar plasmas.

BACKGROUND

Carbon fiber reinforced plastic ("CFRP") materials are increasingly being used in place of aluminum to form the skin panels and structural members of commercial airplanes. CFRP materials are advantageous compared to aluminum due to the higher strength-to-weight ratios provided by carbon composites. However, CFRP materials appear to be more susceptible to catastrophic damage from lightning strikes than aluminum materials.

Typical lightning strike related failures in CFRP materials appear to be driven by high temperatures. The carbon fibers in the composite materials become very hot when subjected to a lightning strike. The temperature may exceed the pyrolization temperature of the resin, turning the resin from a solid to a gas. The corresponding increase in internal gas pressure contributes to the damage to the structure by delaminating the layers and, possibly, puncturing the underlying systems or structure. The high temperatures can also cause permanent damage to the fibers, resulting in expansion of the fiber diameter. Localized heating in combination with material coefficient of thermal expansion also influences damage. Impact forces associated with lightning strike are acoustic, electromagnetic and pneumatic in origin. These forces can exceed material tensile strength limits at corresponding elevated temperatures.

Current solutions use electrical paths to effectively conduct and distribute the electrical current away from the lightning attachment zone in an effort to avoid sparking. These electrical paths are integrated into the CFRP material design, such as beneath an outer paint layer (e.g., a polyurethane layer). However, despite the use of well-designed electrical paths to conduct the electrical current, substantial structural damage is still being observed.

Accordingly, those skilled in the art continue to seek new techniques for avoiding structural damage resulting from lightning strikes.

SUMMARY

In one aspect, the disclosed method for reducing structural damage to a substrate resulting from interaction between the substrate and a plasma may include the steps of identifying a wavelength at which a spectral radiance of the plasma is at a peak, the wavelength being a function of a temperature of the plasma, preparing a coating capable of imparting to the substrate a threshold electromagnetic reflectivity over a spectral band about the wavelength, and applying the coating to the substrate. In one embodiment, the threshold electromagnetic reflectivity is at least about 90 percent. In another embodiment, the threshold electromagnetic reflectivity is at least about 95 percent. In yet another embodiment, the threshold electromagnetic reflectivity is at least about 99 percent.

In another aspect, the disclosed method for reducing structural damage to a substrate resulting from contact between the substrate and a lightning strike may include the steps of preparing a coating capable of imparting to the substrate a threshold electromagnetic reflectivity in the vacuum ultraviolet spectrum and applying the coating to the substrate.

Other aspects of the disclosed spectrally selective coatings and associated methods for minimizing the effects of lightning strikes will become apparent from the following description, the accompanying drawings and the appended claims.

DETAILED DESCRIPTION

Lightning has both direct and indirect effects on substrates. Specifically, it has now been discovered that radiative heating has a significant direct effect, in addition to other direct effects, such as electrical resistance heating, electromagnetic and acoustic forces and electrical sparking. Indirect effects include an intense electromagnetic pulse (EMP), bound charges and induced voltage exposure to wire bundles and avionics.

Typical lightning direct effects protection provides the substrate (e.g., the exterior structure of an aircraft) with the ability to withstand the initial and subsequent attachments of the lightning plasma at currents of up to 200,000 amperes without adverse consequence. Typical lightning direct effects protection may also assure that no sparking occurs at structural joints or on fuel and hydraulic couplings as the electrical current travels between the lightning attachment and exit points.

Pursuant to the present disclosure, lightning direct effects protection may also include protection from radiative heating between the lightning plasma (or any other destructive high temperature plasma) and the substrate. Specifically, in one aspect of the present disclosure, a substrate may be provided with a spectrally selective coating that is designed and fabricated to provide a high level of reflectivity of the incident ultraviolet ("UV") energy radiated from the lightning plasma source. In another aspect, the spectrally selective coating may also be emissive in the infrared ("IR") bands, thereby helping to dissipate the energy absorbed from the lightning plasma by re-radiating it back to the environment to minimize heat soaking into the substrate, which, as discussed above, may adversely affect the substrate.

As used herein, "substrate" broadly refers to any substrate capable of being damaged by a lightning strike or other damaging plasma. The substrate may be any substrate that is not inherently reflective of UV energy or a substrate that is in need of additional UV reflectivity. CFRP materials are only one example of appropriate substrates.

Figure 1:
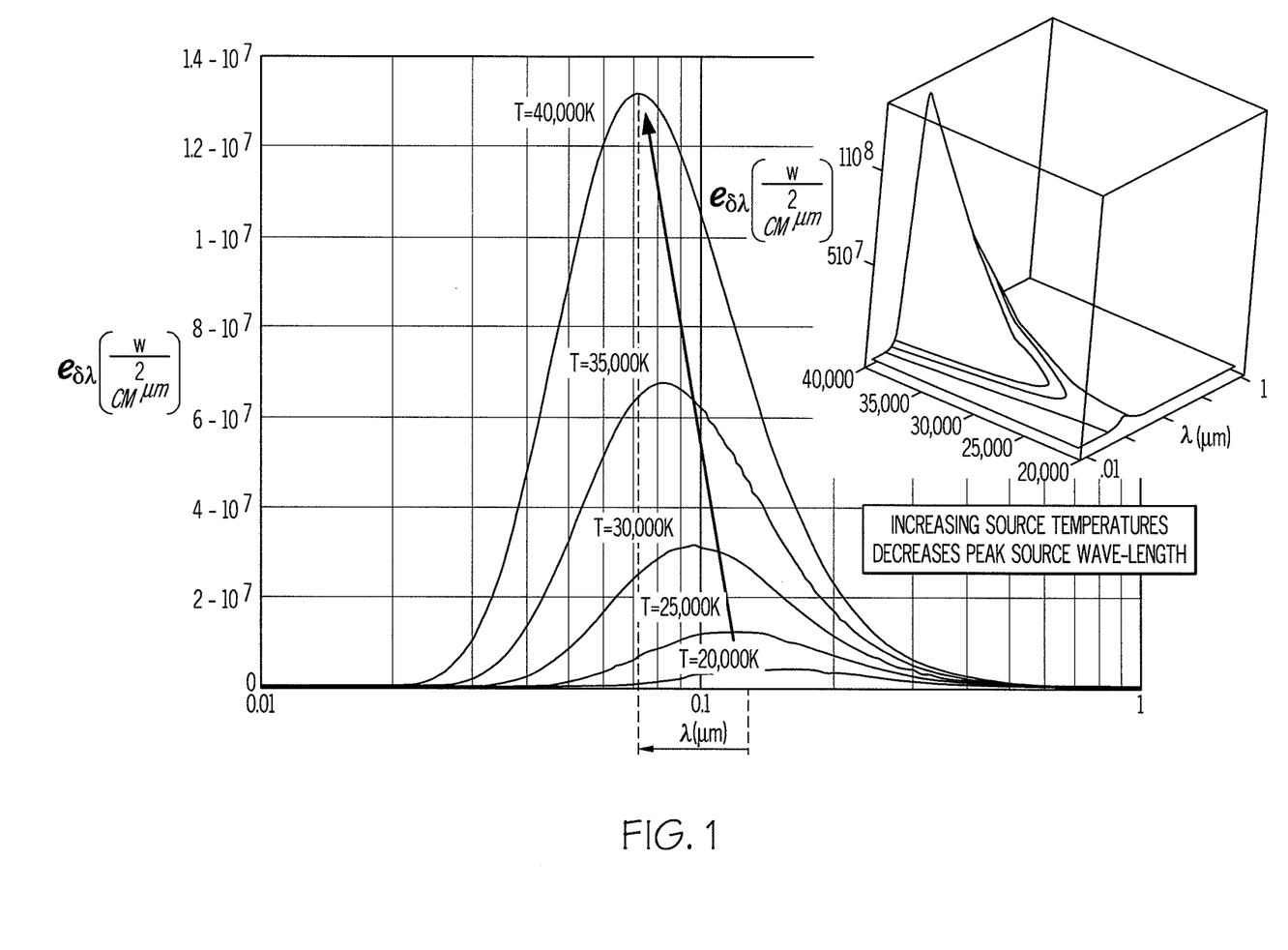
FIG. 1 is a graphical illustration of the spectral radiance of a black body modeling radiant energy versus wavelength and temperature.

Lightning is believed to have a plasma temperature of about 28,000° K, perhaps ranging from about 25,000 to about 30,000° K. Therefore, referring to FIG. 1, which is a graphical illustration of Plank's law regarding the spectral radiance of electromagnetic radiation emanating from a black body, the peak wavelength of lightning occurs at about 100 nm. At higher plasma temperatures, the peak wavelength shifts to the left (i.e., higher energy UV). At lower temperatures, the peak wavelength shifts toward the right (i.e., lower energy UV).

Thus, in one aspect, the disclosed spectrally selective coating may be configured to reflect or backscatter the shorter wavelength (e.g., about 100 nm) incident UV energy from the lightning plasma. In another aspect, the disclosed spectrally selective coating may be configured to reflect or backscatter incident UV energy in the vacuum ultraviolet ("VUV") regime (i.e., 200 nm to 10 nm). In yet another aspect, the disclosed spectrally selective coating may be configured to reflect or backscatter incident UV energy in the other UV regimes that affect lightning strike performance, including UVC (below 280 nm), UVB (320 nm -280 nm) and UVA (400 nm -320 nm). In yet another aspect, the disclosed spectrally selective coating may provide high reflectivity below 500 nm.

Figure 2A:
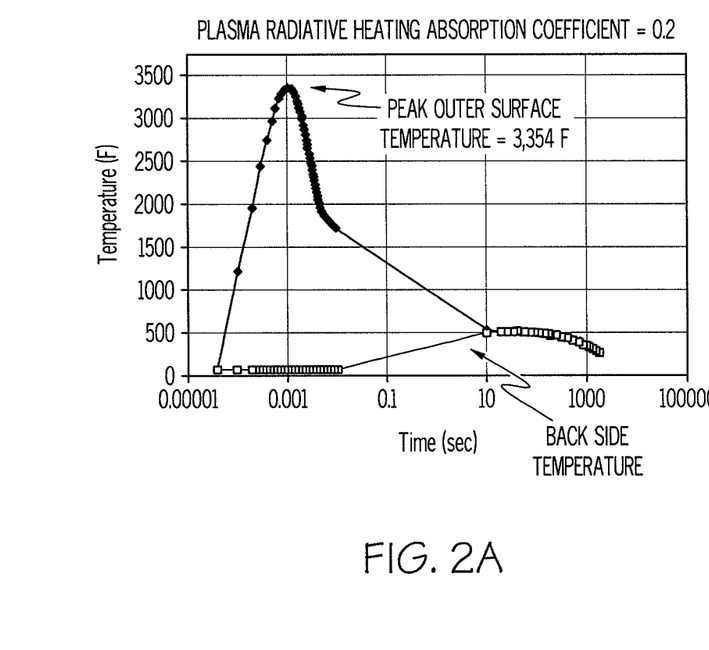
FIG. 2A is a graphical illustration of the outer and inner surface temperatures versus time for a substrate provided with a radiative heating absorption coefficient of 0.2.
Figure 2B:
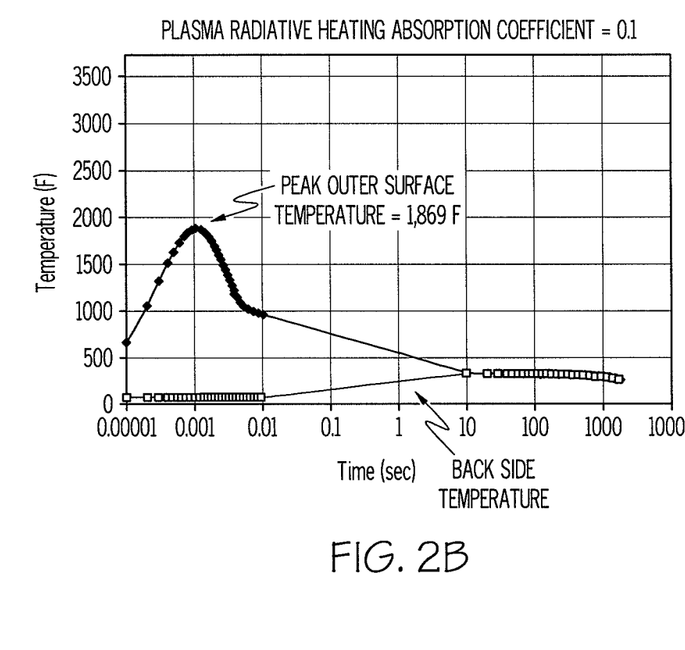
FIG. 2B is a graphical illustration of the outer and inner surface temperatures versus time for a substrate provided with a radiative heating absorption coefficient of 0.1.

FIGS. 2A and 2B illustrate how the outer and inner surface temperatures of a substrate are affected by the absorption coefficient to the UV energy. A first substrate is provided with a 20 mil coating of niobium (a high melting-point reflective metal) to yield a plasma radiative heating absorption coefficient of 0.2 (20% of the incident energy is absorbed into the panel surface). Niobium was selected as the outer layer in order to avoid energy terms associated with material phase change and oxidation so that only effects of absorptivity are illustrated in the parametric trends. Upon exposure to a 10.28 kA simulated lightning strike having a plasma temperature of 30,500° K, the outer surface of the first substrate reached a peak temperature of about 3,354° F. and the inner surface reached a peak temperature of about 500° F. (see FIG. 2A). In contrast, a second substrate having a plasma radiative heating absorption coefficient of 0.1 reached a peak outer surface temperature of about 1,869° F., with a corresponding lower peak inner surface temperature (see FIG. 2B). Therefore, the reduction in the absorption coefficient reduced the back side heat soak temperature and, as such, reduced radiative heating related damage.

Similar analyses have shown the benefits of a higher IR emissivity after the lightning strike where the higher emissivity effectively re-radiates heat from the panel post-strike surface due to elevated surface temperatures compared to the surrounding environment, but at lower temperatures than the lightning plasma.

The foregoing establishes the benefits of controlling the substrate spectral absorptivity. In this case, if the UV absorptivity can be reduced to 0.1, the peak outer surface temperature is limited to 1,869° F. If the IR emissivity is maximized after the lightning strike the backside heat soak temperature is limited. Low UV absorptivity and high IR emissivity is possible by selectively tailoring the coating emissivity.

Figure 3A:
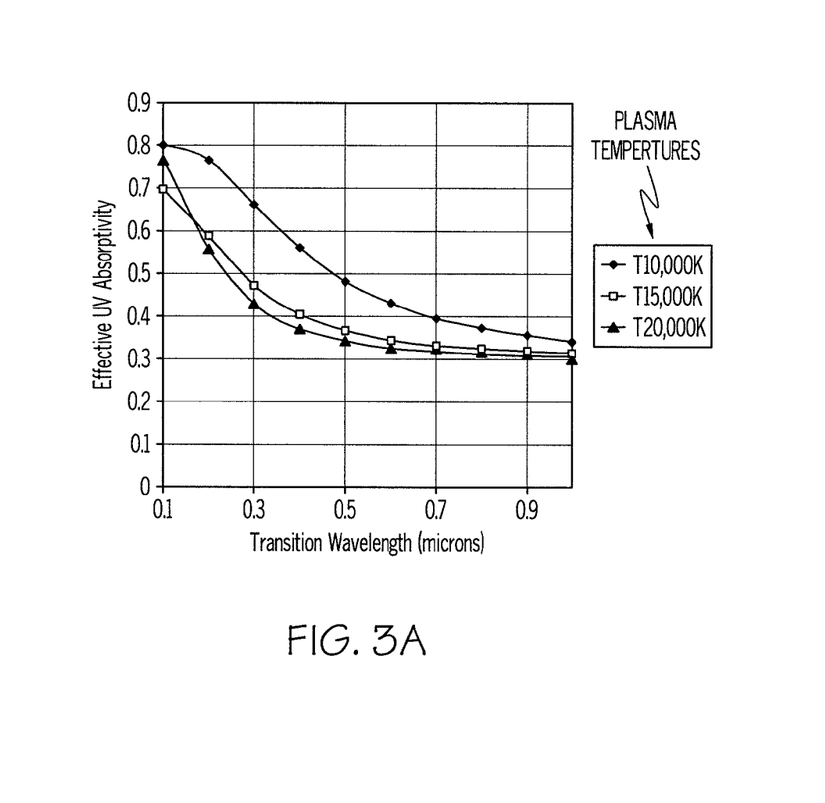
FIG. 3A is a graphical illustration of effective ultraviolet absorptivity versus wavelength for various lightning plasma temperatures.

FIG. 3A illustrates the effective coating absorptivity of a surface exposed to lightning temperatures of 10,000° K, 15,000° K and 20,000° K. This analysis was performed by integrating the product of the temperature dependent spectral blackbody emission by the spectral absorptivity and dividing by the total blackbody emissions. The parametrics include two absorptivity values, one below the transition wavelength and one above the transition wavelength shown on the x axis. Below the transition wavelength the absorptivity is 0.3 and above the transition wavelength the absorptivity is 0.8 (a step function). For the range of higher plasma temperatures shown, the effective UV absorptivity remains near the low value of 0.3 below and above the transition wavelength of 0.5 microns. A high IR (wavelength greater than about 1.0 micron) absorptivity does not adversely impact the desired low UV absorptivity. This is because only a small fraction of the source energy at these temperatures exists in the IR.

Figure 3B:
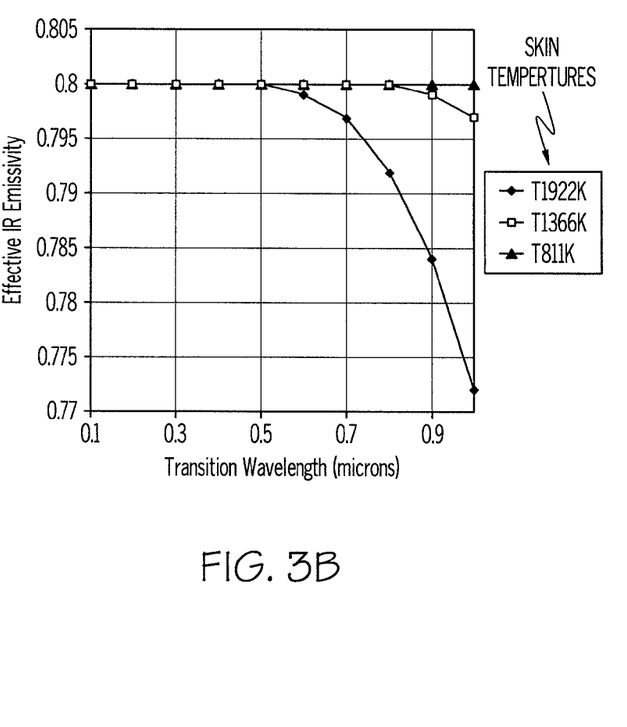
FIG. 3B is a graphical illustration of effective infrared emissivity versus wavelength for various skin temperatures.

FIG. 3B shows the effective IR emissivity for skin temperatures of 1922° K, 1366° K and 811° K at parametric transition wavelengths along the x-axis. Below the transition wavelength the absorptivity is 0.3 and above the transition wavelength the absorptivity is 0.8. The environmental temperature is 70 F. Here, the effective IR emissivity is little changed for the higher skin temperatures by the transition wavelength.

Thus, the coating spectral selectivity may be facilitated by the temperature regimes of the lightning plasma temperatures and subsequent surface temperatures which separate the peak energy spectral regimes from about 100 nm UV peak (based upon a source temperature of 2,897° K) to about 1 μm and above, where IR surface emissions are significant.

In one aspect, the disclosed spectrally selective coating may be designed and fabricated to be reflective in the UV wavelengths and emissive in the IR wavelengths by depositing particles upon the surface of the substrate which are relatively large compared to the UV wavelengths and relatively small compared to the IR wavelengths. UV reflectivity measurements, including VUV reflectivity measurements, are possible with special instruments available within the industry. In one example, these particles may be metallic (e.g., niobium particles). As another example, these particles may include $SiO_2$ or $TiO_2$, as well as combinations thereof.

The particles may be contained in a binder which may be transparent or semi-transparent to visual light. For example, the binder may be polyurethane. The interactions of the pigment, binder, environment and human visual response result in perceived brightness and color. These characteristics can also be broken down into directional and spectral quantification.

Figure 4:
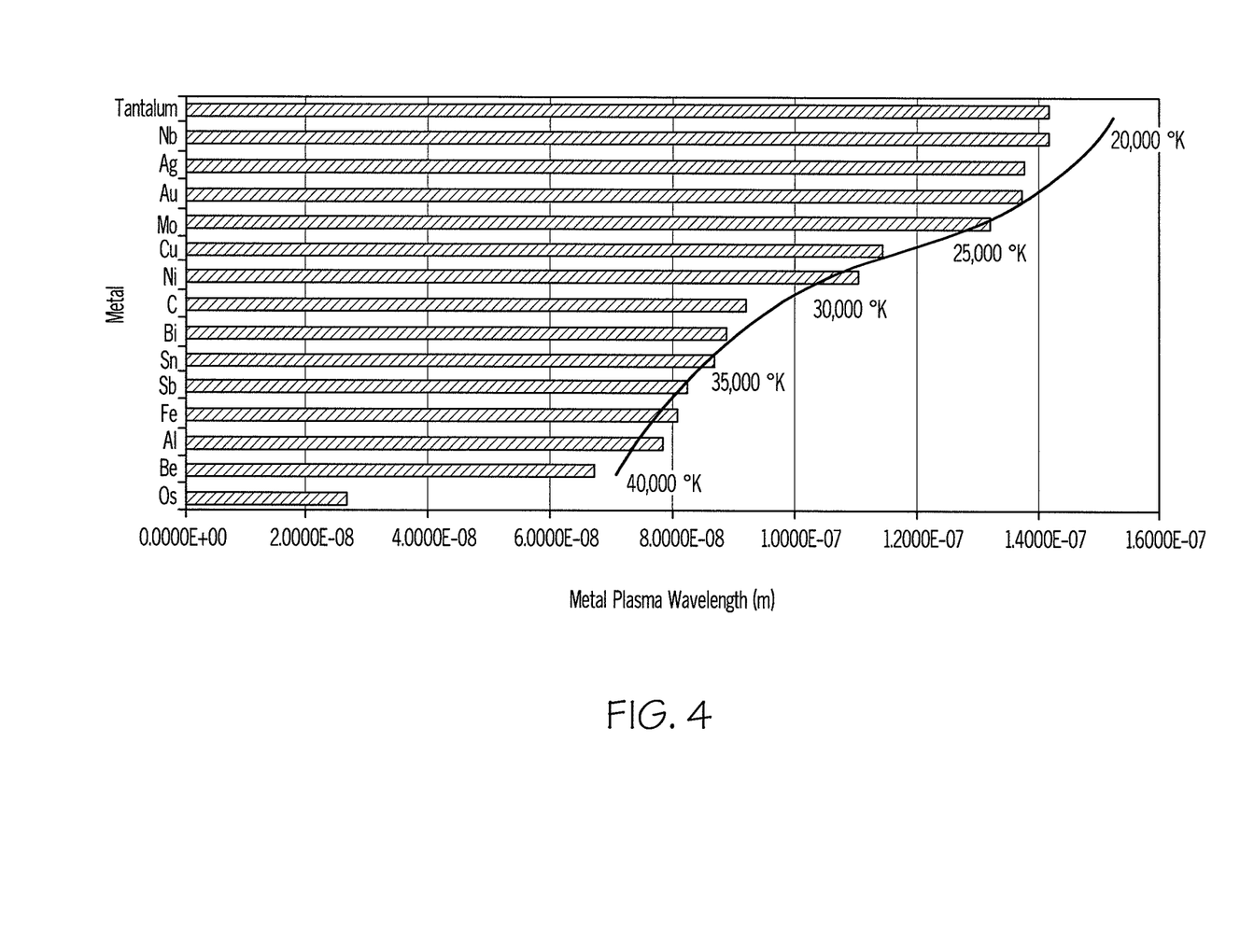
FIG. 4 is a graphical illustration of plasma wavelengths for various metals.

A phenomenon with metals exposed to the VUV spectral region where the UV energy propagates through the metals is referred to as the ultraviolet transparency of metals. FIG. 4 identifies candidate metals (and non-metals), showing source blackbody temperatures and wavelengths where propagation may occur within the materials. For example, at 30,000° K, the blackbody peak wavelength corresponds to a number less than 1.0 E-7 m (100 nm). When exposed to the 30,000° K plasma, metals with plasma wavelengths above this blackbody peak energy wavelength will propagate the radiative energy. As the energy propagates through the metal, it is also scattered and absorbed, thereby resulting in a net high radiative absorptivity. Therefore, these metals may not be considered appropriate candidates for UV reflectivity enhancement.

Instead, metals with metallic plasma wavelengths below the peak energy blackbody wavelengths may be used to provide a coating material that is reflective in such UV bands. Additionally, the metal optical properties should remain functional at resulting lightning strike temperatures.

Two types of materials which remain transmissive at submicron wavelengths are silicone based polymers and fluoropolymers, although currently these are not transmissive in the VUV. Silicone based polymers have transparencies of 85 percent at 250 nm for a 60 micron thick film. In lieu of available VUV transmissive binder materials, the pigment may be mixed into a standard binder such as polyurethane. With properly tuned pigment/binder volumetric fractions the binder is expected to erode only to the depth of underlying pigment particles (including binder residue) with little to no degradation of the surface reflectivity.

At this point, those skilled in the art will appreciate that (1) the functional pigment particles may be bound to the upper surface of a substrate and contained on the upper surface of the substrate within a binder material, (2) the pigment particles may be contained within a binder material that is sufficiently transparent in the VUV, (3) the pigment particles may be contained within a binder material that is not (or substantially not) transparent in the VUV, and (4) combinations thereof.

In another aspect, the disclosed spectrally selective coating may also limit reflectivity in the IR, thereby functioning in a manner similar to a "cold mirror." A cold mirror is a specialized dielectric mirror, a dichroic filter which reflects the visible light spectrum while efficiently transmitting IR wavelengths.

Typically, cold mirrors that are made for optical purposes are relatively small and expensive compared to coverage required for a composite panel coating and compared to the cost that would be allowable for a composite panel coating. The cold mirrors are produced by stacking layers of materials, which through optical properties and layer thicknesses result in constructive and destructive interference of the wavefront. Dichroic filters are not typically available for the wavelength associated with peak lightning strike radiant energy (i.e., about 100 nm).

Figure 5A:
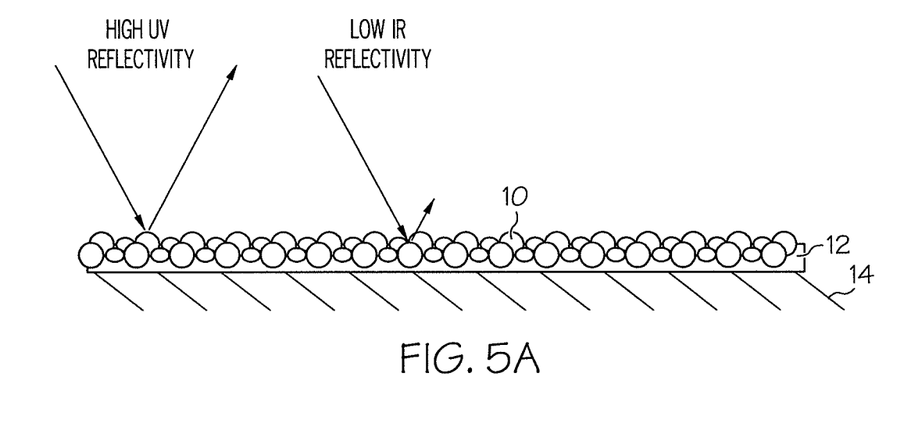
FIG. 5A is a schematic cross-sectional view of a substrate coated with a spectrally selective coating comprising spherical pigments.
Figure 5B:
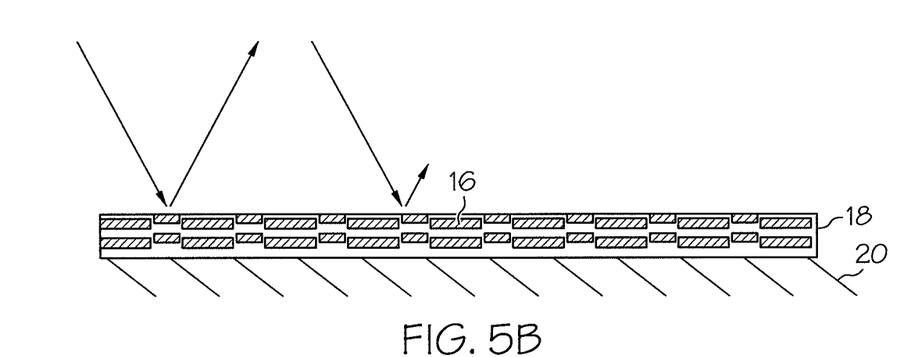
FIG. 5B is a schematic cross-sectional view of a substrate coated with a spectrally selective coating comprising plate-like pigments.

One way of accomplishing the desired dichroic functionality of the coating is through the use of a distribution of surface particles that are relatively large compared to the UV wavelength and relatively small compared to the IR wavelengths. As shown in FIG. 5A, spherical coating pigment particles 10 may be suspended in a binder 12 and layered over a substrate 14 (e.g., a CFRP substrate) to form a spectrally selective coating. Similarly, as shown in FIG. 5B, plate-like coating pigment particles 16 may be suspended in a binder 18 and layered over a substrate 20.

According to MIE theory, depending upon particle optical properties, small wavelengths will backscatter and larger wavelengths will forward scatter. The particle materials may also be fabricated from multi-layer stacks where the materials are produced through various deposition processes, ground and sieved to produce the appropriate size distributions.

Figure 6:
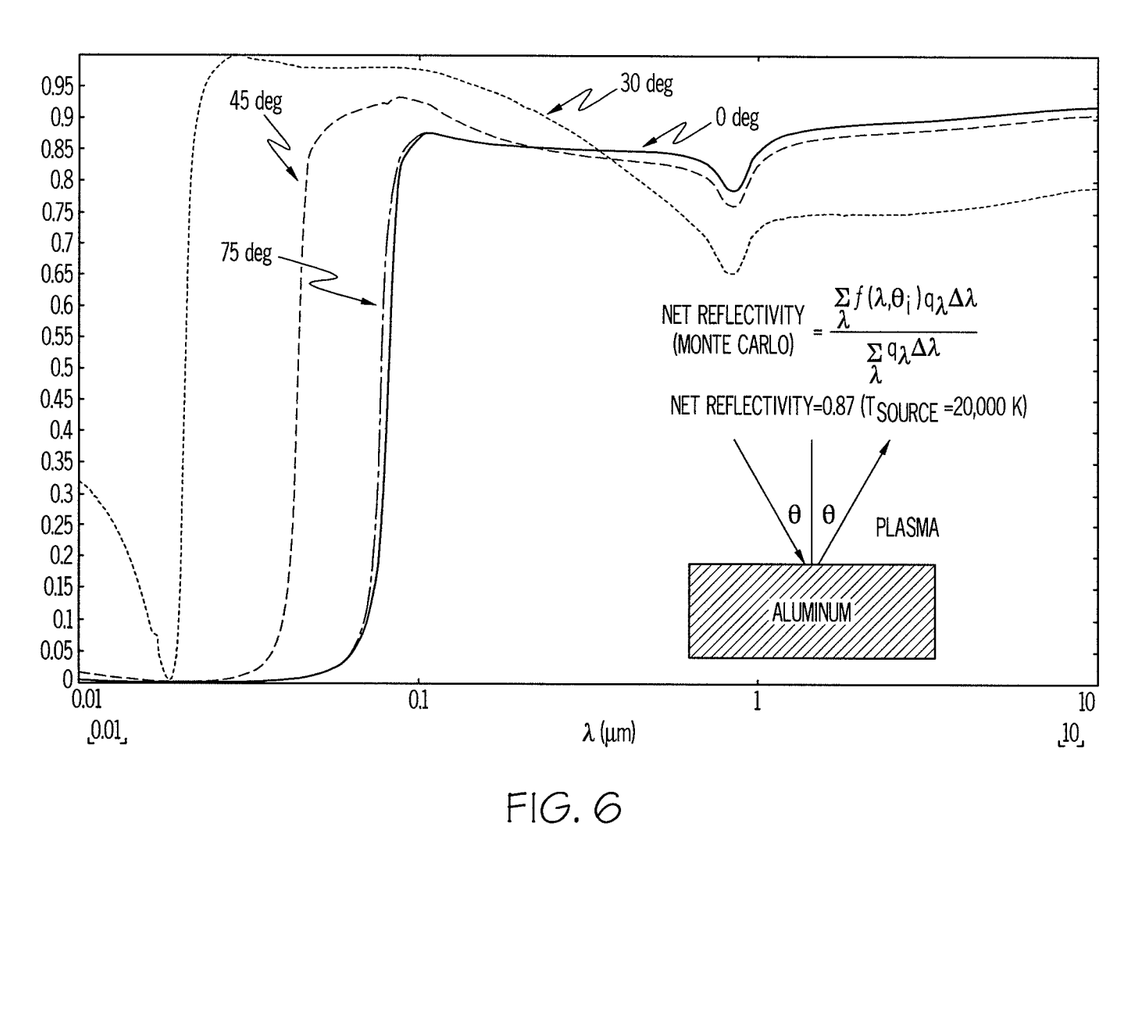
FIG. 6 is a graphical illustration of the spectral and net reflectivity for a thick layer of aluminum adjacent to a 20,000° K plasma.

Aluminum is a common reflective material choice for space-based optical sensors designed to study solar VUV. FIG. 6 illustrates the total spectral reflectivity of non-oxidized aluminum adjacent to a plasma. The total spectral reflectivity includes both Transverse Electric (TE) and Transverse Magnetic (TM) polarizations. If a lambertian extended source is placed in front of the aluminum, photons will reflect from the aluminum as a function of wavelength and incident angle. The surface is interrogated using a Monte Carlo method to simulate the net reflectivity of a thick layer of aluminum in a 20,000° K radiative environment. The net reflectivity is 0.87 based upon the spectral/spatial reflectivity and probability function of the incident angles of the incident photons.

Figure 7:
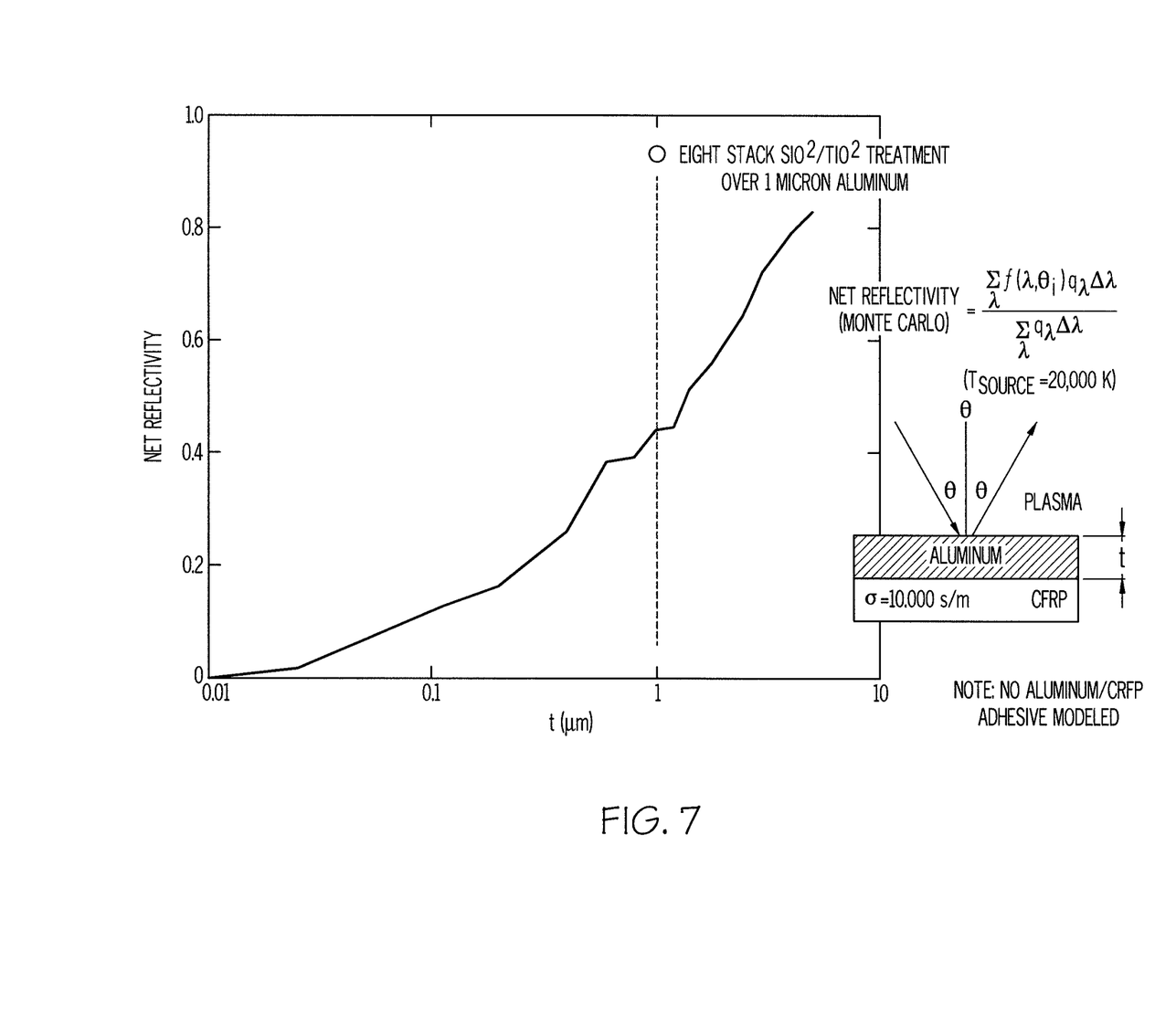
FIG. 7 is a graphical illustration of net reflectivity versus thickness for an aluminum layer positioned between a 20,000° K plasma and a CFRP substrate.

FIG. 7 shows the net reflectivity of aluminum versus thickness when sandwiched between 20,000° K lightning plasma and a CFRP substrate. One problem with aluminum is that it must be about 10 μm (i.e., about 0.5 mil) to reach a net reflectivity on the order of 80 percent. Therefore, as a coating pigment, aluminium may require a substantial coating thickness and weight. As such, aluminum may be more acceptable as an appliqué film with the appropriate passivation layer (aluminum quickly oxidizes), although a metal such as niobium would better suit the thermal environment.

Figure 8:
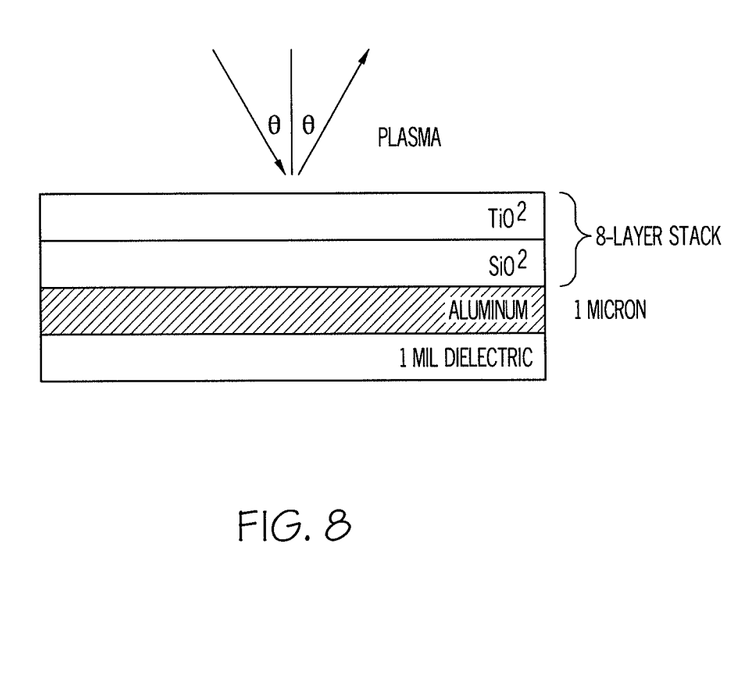
FIG. 8 is a block diagram of a CFRP substrate provided with a spectrally selective coating in accordance with an aspect of the present disclosure.

FIG. 8 illustrates a pigment particle exposed to 20,000° K lightning plasma, wherein the pigment particle includes a 1 μm thick layer of aluminum treated with an 8-layer quarter wave stack of $SiO_2$ and $TiO_2$. The coating sub-layer thickness $T_{SiO2}$ of $SiO_2$ may be determined using Eq. 1 as follows:

$$T_{SiO2} = \frac{\lambda_{peak}}{|4 \cdot n_{SiO2}|} \quad \text{(Eq. 1)}$$

and the coating sub-layer thickness $T_{TiO2}$ of $TiO_2$ may be determined using Eq. 2 as follows:

$$T_{TiO2} = \frac{\lambda_{peak}}{|4 \cdot n_{TiO2}(\lambda_{peak})|} \quad \text{(Eq. 2)}$$

wherein $\lambda_{speak}$ is the peak wavelength, $n_{SiO2}(\lambda_{peak})$ is the index of refraction of $SiO_2$ as a function of the wavelength and $n_{TiO2}(\lambda_{peak})$ is the index of refraction of $TiO_2$ as a function of the wavelength.

Those skilled in the art will appreciate that the aluminum layer may alternatively be positioned between layers of $TiO_2$ and $SiO_2$. Also, those skilled in the art will appreciate that metals other than aluminum may be used.

For example, when the peak wavelengh is 100 nanometers, the composition and thicknesses of the layers of the pigment particle may be as shown in Table 1.

TABLE 1

| Layer | Composition | Thickness (nm) |
|---|---|---|
| 1A | Titanium dioxide | 26 |
| 1B | silicon dioxide | 15 |
| 2A | Titanium dioxide | 26 |
| 2B | silicon dioxide | 15 |
| 3A | Titanium dioxide | 26 |
| 3B | silicon dioxide | 15 |
| 4A | Titanium dioxide | 26 |
| 4B | silicon dioxide | 15 |
| 5A | Titanium dioxide | 26 |
| 5B | silicon dioxide | 15 |
| 6A | Titanium dioxide | 26 |
| 6B | silicon dioxide | 15 |
| 7A | Titanium dioxide | 26 |
| 7B | silicon dioxide | 15 |
| 8A | Titanium dioxide | 26 |
| 8B | silicon dioxide | 15 |
| 9 | Aluminum | 100 |

The total pigment thickness may be less than about 1.4 μm and may provide a net reflectivity of about 96 percent. The thickness of the layers in the stack may shorten by the real index of refraction component compared to in a vacuum.

Accordingly, the disclosed spectrally selective coatings provide a means of eliminating or reducing material and structural damage from extreme radiative heating due to lightning strike. Subsequent to the lightning strike, heat soak may be minimized by maximizing the thermal emissions in the IR band. Therefore, those skilled in the art will appreciate that the disclosed spectrally selective coatings may be used in conjunction with available electrical conductivity designs, including conductive adhesive binder materials, to minimize or prevent panel damage due to lightning strike.

Furthermore, those skilled in the art will appreciate that parametrics have shown that a spectral transition wavelength of about 0.5 μm with a high reflectivity, such as about 0.1 below about 0.5 μm, and a high emissivity, such as about 0.8 above about 0.5 μm, significantly reduces material temperatures during and after a lightning strike.

Still furthermore, those skilled in the art will appreciate that the selective reflectivity coating may be attained through the development of a coating comprising a distribution of particles sized to backscatter the UV energy, but to allow forward IR scattering into the coating. The forward IR scattering results in absorption. The coating will likewise provide high emissivity in the IR bands which will effectively radiate post lightning strike radiative energy to the surrounding environment. The high UV reflectivity may be attained through the use of quarter wave stack lay-ups over aluminum.

Although various aspects of the disclosed spectrally selective coatings and associated methods for minimizing the effects of lightning strikes have been shown and described, modifications may occur to those skilled in the art upon reading the specification. The present application includes such modifications and is limited only by the scope of the claims.

What is claimed is:

1. A method for reducing structural damage to a composite substrate resulting from interaction between said composite substrate and a plasma, said method comprising the steps of:
   identifying a wavelength at which a spectral radiance of said plasma is at a peak, said wavelength being a function of a temperature of said plasma;
   providing a plurality of pigment particles having a size distribution comprising a first portion of pigment particles that are relatively large compared to ultraviolet (UV) wavelengths thereby backscattering UV energy and a second portion of pigment particles that are relatively small compared to infrared (IR) wavelengths thereby forward scattering IR energy;
   preparing a spectrally selective coating comprising said plurality of said pigment particles in a binder; and
   applying said spectrally selective coating to said composite substrate.

2. The method of claim 1 wherein said plasma is lightning plasma.

3. The method of claim 1 wherein said composite substrate includes carbon fibers.

4. The method of claim 1 wherein said wavelength is at most about 500 nm.

5. The method of claim 1 wherein said wavelength is in the range of about 20 to about 200 nm.

6. The method of claim 1 wherein said wavelength is about 100 nm.

7. The method of claim 1 wherein said spectrally selective coating includes substantially spherical pigment particles.

8. The method of claim 1 wherein said spectrally selective coating includes substantially flat-shaped pigment particles.

9. The method of claim 1 wherein said pigment particles of said plurality include a quarter wave stack including silicon dioxide defining a first sub-layer thickness and titanium dioxide defining a second sub-layer thickness.

10. The method of claim 9 wherein said quarter wave stack is received over a layer of aluminum.

11. The method of claim 10 wherein the layer of aluminum is at most about 1 μm thick and the total thickness of the spectrally selective coating, including the layer of aluminum, is less than about 1.4 μm.

12. The method of claim 10 wherein the spectrally selective coating has a net reflectivity of about 96 percent.

13. The method of claim 1 wherein said pigment particles of said plurality include a quarter wave stack including a first material defining a first sub-layer thickness and a second material defining a second sub-layer thickness, wherein said first material has a different index of refraction as a function of the wavelength than said second material.

14. The method of claim 1 wherein the binder comprises one or more of a material that is transparent or semitransparent to visible light, and a material sufficiently transparent in the vacuum ultraviolet range.

15. The method of claim 1 wherein the composite substrate is not inherently reflective of UV energy.

* * * * *